United States Patent [19]

Prater et al.

[11] Patent Number: 5,463,897
[45] Date of Patent: Nov. 7, 1995

[54] SCANNING STYLUS ATOMIC FORCE MICROSOPE WITH CANTILEVER TRACKING AND OPTICAL ACCESS

[75] Inventors: Craig B. Prater; James Massie; David A. Grigg; Virgil B. Elings; Paul K. Hansma; Barney Drake, all of Santa Barbara, Calif.

[73] Assignees: Digital Instruments, Inc., Santa Barbara; The Regents of the University of California, Oakland, both of Calif.

[21] Appl. No.: 107,017

[22] Filed: Aug. 17, 1993

[51] Int. Cl.$^6$ ................................................. G01B 5/28
[52] U.S. Cl. ............................................................ 73/105
[58] Field of Search ............................. 73/105; 250/306, 250/307

[56] References Cited

U.S. PATENT DOCUMENTS

| | | | |
|---|---|---|---|
| 3,013,467 | 12/1961 | Minsky | 356/432 |
| 4,914,293 | 4/1990 | Hayashi et al. | 250/306 |
| 4,935,634 | 6/1990 | Hansma et al. | 250/306 |
| 4,985,627 | 1/1991 | Gutierrez et al. | 250/306 |
| 5,025,658 | 6/1991 | Elings et al. | 250/306 |
| 5,047,633 | 9/1991 | Finlan et al. | 250/307 |
| 5,051,646 | 9/1991 | Elings et al. | 310/317 |
| 5,117,466 | 5/1992 | Buican et al. | 382/6 |
| 5,127,730 | 7/1992 | Brelje et al. | 356/318 |
| 5,136,162 | 8/1992 | Miyamoto et al. | 250/307 |
| 5,142,145 | 8/1992 | Yasutake | 250/306 |
| 5,144,833 | 9/1992 | Amer et al. | 73/105 |
| 5,164,791 | 11/1992 | Kubo et al. | 250/306 |
| 5,166,516 | 11/1992 | Kajimura | 250/307 |
| 5,172,002 | 12/1992 | Marshall | 250/306 |
| 5,198,715 | 3/1993 | Elings et al. | 310/328 |
| 5,200,617 | 4/1993 | Hayes et al. | 250/306 |
| 5,206,702 | 4/1993 | Kato et al. | 250/306 |
| 5,214,282 | 5/1993 | Yamaguchi et al. | 250/307 |
| 5,231,286 | 7/1993 | Kajimura et al. | 250/306 |
| 5,253,516 | 10/1993 | Elings et al. | 250/306 |
| 5,254,854 | 10/1993 | Betzig | 250/306 |
| 5,260,824 | 11/1993 | Okada et al. | 250/306 |
| 5,266,801 | 11/1993 | Elings et al. | 250/307 |
| 5,276,324 | 1/1994 | Ohtaki et al. | 250/307 |
| 5,291,775 | 3/1994 | Gamble et al. | 73/105 |
| 5,319,960 | 6/1994 | Gamble et al. | 73/105 |

FOREIGN PATENT DOCUMENTS

| | | | |
|---|---|---|---|
| 698194 | 11/1964 | Canada | 73/105 |
| 1747899 | 7/1992 | U.S.S.R. | 73/105 |

OTHER PUBLICATIONS

"Novel Stationary–Sample Atomic Force Microscope with Beam–Tracking Lens," Electronic Letters, vol. 29, No. 3, Feb. 4, 1993, P. S. Jung, et al., pp. 264–266.

"Scanned–Cantilever Atomic Force Microscope," American Institute of Physics (1993), Rev. Sci. Instrum. 64 (4), Apr. 1993, David R. Baselt, et al., pp. 908–911.

"Atomic Force Microscopy for High–Resolution Imaging Cell Biology," Trends in Cell Biology, vol. 2, Jul. 1992, Jan H. Hoh, et al., pp. 208–212.

"A Stand–Alone Scanning Force and Friction Microscope," Ultramicroscopy 42–44 (1992), M. Hipp, et al., pp. 1498–1503.

(List continued on next page.)

Primary Examiner—Hezron E. Williams
Assistant Examiner—Daniel S. Larkin
Attorney, Agent, or Firm—Oblon, Spivak, McClelland, Maier, & Neustadt

[57] ABSTRACT

A scanned-stylus atomic force microscope (AFM) employing the optical lever technique, and method of operating the same. The AFM of the invention includes a light source and a scanned optical assembly which guides a light beam emitted from the laser source onto a point on said cantilever during scanning thereof. A moving laser beam is thus created which will automatically track the movement of the cantilever during scanning. The invention also allows the laser beam to be used to measure, calibrate or correct the motion of the scanning mechanism, and further allows viewing of the sample and cantilever using an optical microscope.

41 Claims, 10 Drawing Sheets

OTHER PUBLICATIONS

"A High–Performance Scanning Force Microscope Head Design," American Institute of Physics (1993), Rev. Sci. Instrum. 64 (4), Apr. 1993, Steven M. Clark, et al., pp. 904–907.

"Atomic Force Microscopy Using a Piezoresistive Cantilever," 1991 International Conference on Solid–State Sensors and Actuators, Jun. 24–27, 1991, M. Tortonese, et al., pp. 448–451.

"An Atomic–Resolution Atomic–Force Microscope Implemented Using an Optical Layer", Alexander, et al., J. Appl. Phys. 65(1), Jan. 1, 1989, 1988 American Institute of Physics pp. 164–167.

"Stand–Alone Atomic Force Microscope Featuring Large Scan, Friction Measurement, Atomic Resolution and Capability of Liquid Operation", Putman, et al., SPI vol. 1855 Scanning Probe Microscopies II (1993), pp. 202–208.

"Atomic Resolution with an Atomic Force Microscope Using Piezoresistive Detection", Tortonese, et al., Appl. Phys. Lett. 62(8), Feb. 22, 1993, American Institute of Physics, pp. 384–836.

"Atomic Force Microscopy of Biological Samples at Low Temperature", Prater et al., J. Vac. Sci. Technol. B 9(2), Mar. and Apr. 1991, 1991 American Vacuum Society pp. 989–991.

"A Detailed Analysis of the Optical Beam Deflection Technique for Use in Atomic Force Microscopy", Putnam, et al., J. Appl. Phys. 72(1), Jul. 1, 1992, 1992 American Institute of Physics, pp. 6–12.

"Optical–Beam–Deflection Atomic Force Microscopy: The NACL (001) Surface", Meyer, et al., Appl. Phys. Lett. 56 (21), May 21, 1990, 1990 American Institute of Physics, pp. 2100–2101.

SCANNING STYLUS ATOMIC FORCE MICROSOPE WITH CANTILEVER TRACKING AND OPTICAL ACCESS

BACKGROUND OF THE INVENTION

1. Field of the Invention

The present invention relates to scanned-stylus atomic force microscopes and a method of operating a scanned-stylus atomic force microscope, and in particular to large scan optical lever atomic force microscopes.

2. Discussion of the Background

Atomic force microscopes (AFMs) are extremely high resolution surface measuring instruments. The AFM is described in detail in several U.S. Patents including U.S. Pat. Nos. 4,935,634 to Hansma et al, 5,025,658 to Flings et al, and 5,144,833 to Amer et al. The AFM scans a stylus mounted on a flexible spring lever (cantilever) with respect to a sample. The actual motion can be produced by translating either the sample or the stylus and cantilever. This motion can be produced by any scanning mechanism, but is typically produced by a piezoelectric translator. All generic scanning mechanisms will be referred to as scanners.

Surface features on the sample interact with the stylus and cause the cantilever to deflect. By measuring the deflection of the cantilever as a function of position over the surface, a map of the surface can be created. In practice, it is often necessary to minimize the force that the cantilever applies to the surface. For this reason, AFMs are usually run under feedback in the "constant force mode." In this mode, the cantilever deflection is kept constant during imaging by moving either the cantilever or the sample with respect to each other. The sample surface is then mapped out by reading a signal indicating the relative motion of the cantilever or sample needed to keep the cantilever deflection constant. When a feedback system is used to keep the cantilever deflection constant, this deflection (and hence force on the sample surface) can be held at a minimum value.

There are also a variety of AC modes where the cantilever is vibrated and features of the sample are sensed by measuring the amplitude, phase, or frequency of the vibrating cantilever. See for example copending application Ser. No. 07/926,175 entitled An Ultra Low Force Atomic Force Microscope by Elings and Gorley.

The first atomic force microscopes used the principal of electron tunneling to detect minute deflections of the cantilever. More recently, two groups (Meyer and Amer, Appl. Phys. Lett., 53 (24), Dec. 12, 1988 and Alexander et al, Appl. Phys. Lett., 65 (1), 1 Jan. 1989 independently succeeded in using the "optical lever technique" to measure cantilever deflections with subnanometer resolution. The "optical lever" technique works in the following way.

Referring to FIG. 1, a prior art AFM system is illustrated. An AFM cantilever 14 is made so that it is sufficiently reflective that it can act as at least a partial mirror. A laser beam 17 from a laser 10 is focused onto one side of the AFM cantilever 14 having a stylus 15 mounted thereon. Laser beam 14 passes through or alongside a scanner 12 using lens 11 and the reflected beam 18 is directed to a position sensitive detector 16, usually a multi-segment photodiode. Cantilever 14 is attached to a mounting substrate 20, which is attached to scanner 12, or to an optional mounting element 19. A cantilever deflection changes the angle of the cantilever with respect to the incoming laser beam 17 and thus moves the reflected laser beam 18 on the position sensitive detector 16 as the cantilever 14 is scanned over the sample 13.

Prior art scanned-stylus AFMs as shown in FIG. 1 focus a laser spot onto one side of a cantilever and then the scanner moves the cantilever over the sample. Since the cantilevers are typically a few hundred microns long and a few tens of microns wide, the focused laser spot must be only 10–30 microns in diameter so that laser light does not spill around the cantilever and onto the sample. If laser light spills around the cantilever, the AFM's sensitivity and therefore vertical resolution is decreased. Also the position sensing photodiode may be disturbed by optical interference from the sample. This means that if a prior art scanned-stylus AFM scans the cantilever more than 10–30 microns, the cantilever will move out from under a stationary laser beam, and the AFM's performance will deteriorate. There is great interest in scanned-stylus AFMs that can scan in the range of 100 microns, much larger than the range of this prior art AFM.

The majority of AFMs that have been built scan a small sample under a fixed stylus and cantilever. There is, however, great interest in AFMs that scan the stylus over a fixed sample. This method has a number of advantages, including the ability to image samples that are too large to be scanned easily. A number of scanned-stylus AFMs have been built and described in the literature. For example, such instruments have been built by G. Meyer and N.M. Amer, Appl. Phys. Lett., 56, p. 2100 (1990), C. B. Prater et al., J. Vac. Sci. Technol., B9, p. 989 (1991), Hipp et al, Ultramicroscopy 42–44, p. 1498 (1992), Putman et al, presented at the OE/LASE '93 Conference, Jan. 19, 1993, Los Angeles, Calif., Baselt and Baldeschweiler Rev. Sci. Instrum. 64, p. 908 (1993), Clark and Baldeschweiler Rev. Sci. Instrum. 64, p. 904, (1993), and by Digital Instruments, U.S. Pat. No. 5,025,658 (E.g., Stand Alone™ AFM, Large Sample Scanning Probe Microscope) assigned to the assignee of the present application.

All of the previous instruments suffer from compromises that do not allow them to take full advantage of the capabilities of AFMs that scan by moving the samples instead of the stylus. Prior art scanned-stylus AFMs that use a fixed laser to measure cantilever deflection have a maximum scan size set by the diameter of the laser beam at the cantilever. If the cantilever is scanned a distance larger than the beam size, it will move out from under the beam, and it will no longer be possible to detect the cantilever motion.

A small number of optical lever scanned-stylus microscopes have been built by using a laser beam that is defocused so that in the plane of the cantilever, it is larger than the desired scan range of the cantilever. Microscopes of this type have been built separately by Meyer et al, supra, C. B. Prater et al. supra, Hipp et al, supra, Baselt et all supra, and Clark et al, supra and are typically of the type shown in FIG. 1. The performance of this type of scanned-stylus AFM is greatly diminished at scan ranges of larger than 10–20 microns. This performance loss is seen in the form of images that appear "warped" and uncontrolled force variation across the scan field. These effects have been recently described by Baselt et al, supra.

The reason for this performance loss is as follows. Scanned-stylus AFMs often use a piezoelectric tube translator (12 in FIG. 1) to scan the cantilever over the sample. Typically, one end of the scanner is held fixed and the other end performs the scanning pattern with a pendulum-like motion. This means that scanning the cantilever over the sample surface changes both the angle and position of the cantilever with respect to the incoming laser beam and the angle and position of the cantilever with respect to the position sensitive detector. Some of these problems are described in the paper by Hipp et al, supra. In addition, some commercial cantilevers are not flat, but are instead warped by a small amount. Even in the case that the cantilever motion is small enough that the laser stays on the cantilever, the deflection of the reflected beam can change by large angles as the laser moves on this warped surface. For example Baselt et al, supra, measured false cantilever deflections of 45 nm while scanning a warped cantilever only 750 nm under a fixed laser.

The net result of these angular and position changes is to move the reflected laser beam across the position sensitive detector. In "constant force mode" operation, however, the position of the laser beam on the detector is held constant with a feedback loop that moves the cantilever with respect to the sample. So changes in the relative angles and positions of the laser, cantilever, and detector will cause the feedback loop to exert more or less force on the surface as the cantilever is scanned to keep the position of the laser constant on the detector. These force variations can be very destructive. Many biological samples cannot be imaged with forces larger than one nanoNewton (nN). See for example Hoh and Hansma, Trends in Cell Biology, 2, p. 208 (1992). In the above case, where a warped cantilever caused a false deflection of 45 nm over a 750 nm scan, the force variation could be as high as 1–10 nN for typical cantilevers. Of course, the force variation increases further for larger scan sizes.

An alternative to the scanned-stylus AFMs described above is described by Elings et al (U.S. Pat. No. 5,025,658). This design, shown in FIG. 2, places the AFM cantilever 14 extremely close to the emitting surface of a laser diode 21. The laser light reflects off the cantilever, back into the laser itself. The reflections will cause optical interference that is detected at a photodiode 22 that is contained within the laser package. Laser diode 21 are attached to scanner 12 using a laser mounting member 23. A miniature optical interferometer is formed such that as cantilever 14 deflects the amount of light detected at photodiode 22 changes. Since the laser, photodetector, and the cantilever are closely coupled, the laser and detector always tracks the cantilever, independent of scan size.

This prior art system has a number of disadvantages, however. First, this type of optical interferometer only has sufficient sensitivity for AFM measurements if the laser and cantilever are very closely coupled, typically with less than 100 micron separation. This requires extremely precise alignment of the cantilever with respect to the laser. Second, the piezoelectric translator must carry the weight of a laser diode near the free end of the translator. This can cause a reduction in the mechanical resonant frequency of the translator, making the translator more susceptible to vibrations. Also, because the laser is so close to the cantilever, it is not possible to view the cantilever and sample simultaneously with an optical microscope.

In addition, the optical interferometer used in the FIG. 2 AFM produces an output that changes periodically with distance. The position of cantilever 14 with respect to laser 21 is selected such that a deflection of cantilever 14 causes a change in the interferometer output. For example, the position could be selected so that positive cantilever deflections cause positive increases in the interference output. Then the force feedback will cause cantilever 14 to retract when the interference output increases. But because the interferometer output is periodic, sudden displacements of cantilever 14 can move it to a point where further deflections cause the interference signal to be opposite to that expected, i.e., decrease rather than increase. This sort of error will cause the feedback system to immediately jump the next period ("mode hop") of the interference signal. This makes accurate force control of the prior art scanned-stylus AFM of FIG. 2 very difficult.

Other versions of scanned-stylus AFMs have been built by Putman et al, supra, and commercial instruments have been produced by Topometrix, Inc. These designs are optical lever AFMs where the cantilever is scanned over a fixed sample. Both of these designs mount the laser and cantilever on the same scanning unit, so that they move together. This prior art is shown schematically in FIG. 3. In FIG. 3 a focusing lens 30 is disposed between laser 10 and cantilever 14. This system has the disadvantage that scanner 12 has to carry the weight of laser 10, electronic leads to laser 10, focusing lens 30, and any mechanism for fine tuning the laser position on cantilever 14. All of these can reduce the mechanical resonant frequency of scanner 12 and transmit vibrations to cantilever 14. Also, in the case of a tube scanner, attachment of a laser to the interior of a scanner can make its exchange difficult in case of laser failure.

In addition, these designs have the laser beam 17, cantilever 14 and stylus 15 move with respect to a fixed position sensitive detector 16. So when cantilever 14 is scanned over the surface of sample 13, reflected laser beam 18 will move with respect to fixed position sensitive detector 16, even in the absence of any actual deflection of cantilever 14.

Other versions of scanned stylus AFMs have relied on scanned optical fibers used as interferometers or as a moving light source for the optical lever technique.

Another form of scanned-stylus AFMs use cantilevers that are instrumented with a piezoelectric or a strain gauge (copending application Ser. No. 08/009,076, U.S. Pat. No. 5,266,801 and Tortonese et al, Transducers '91, 1991 International Conference on Solid-State Sensors and Actuators, San Francisco, Calif., 24–27 Jun. 1991, and Tortenese et al, Appl. Phys. Lett., 62, p. 834, (1993), and produce a voltage or a change in resistance that depends on the deflection of the cantilever.

A number of the prior art AFMS, especially those relying on optical interferometers to detect cantilever deflection, closely couple the cantilever and the laser light source and/or the assembly for detecting the cantilever deflection. In some cases this separation is less than 100 microns. This close coupling makes it extremely difficult to also view the cantilever and the area of the sample that it is scanning with an optical microscope.

SUMMARY OF THE INVENTION

It is an object of the present invention to provide a novel scanned-stylus AFM that detects cantilever deflection by reflecting a laser beam off the back side of the cantilever.

It is a second object of the present invention to prevent scanning the cantilever out from under a fixed laser beam.

Another object of this invention is to provide a scanned-stylus AFM that minimizes the tracking force variation across the entire scan range, and does not create artificially "warped" images.

A further object of this invention is to automatically provide a signal that is proportional to the motion of the cantilever across the sample.

Another object of this invention is to provide an AFM satisfying one or more of the above objects and can also operate with the cantilever and sample covered by fluid.

Still another object of this invention is to allow sufficient separation between the laser light source and the cantilever to provide access for an optical microscope to view the cantilever and the area of the sample that the cantilever is scanning.

These and other objects are achieved according to the present invention by providing a new and improved optical lever scanned-stylus AFM. The AFM includes a scanning mechanism, a fixed light source, a cantilever attached to the scanning mechanism, a stylus mounted on the cantilever and an optical assembly mounted on the scanning mechanism which guides a light beam emitted from the light source onto a point on the cantilever during movement of the scanning mechanism. A position detector receives a light beam reflected from the cantilever and detects a deflection of the cantilever. The optical assembly will move with the scanning mechanism and guide the light beam to a spot on the cantilever while it is scanned across the sample, to avoid both scanning the cantilever out from under a fixed, unguided beam and movement of the beam spot on the cantilever.

The optical assembly that causes the light beam to track the cantilever also provides a means of measuring the actual motion of the scan. A portion of the scanning light beam may be directed to an additional position sensitive detector and the output of this detector can indicate the actual motion of the scanner. Since there may be differences between the desired motion of the scanner and the actual motion of the scanner, this technique provides a means to measure and correct the problem.

The scanning mechanism may comprise a piezoelectric tube scanner, where the optical assembly may also be mounted in the tube scanner. The scanning mechanism may be comprised of two or more different scanning elements, as mentioned in U.S. Pat. No. 5,198,715. One or more of the scanning elements may have asymmetric cutaways that allow mechanical or optical access to the cantilever.

The AFM according to the invention may also include an optical mirror mounted for receiving a light beam from the light source, which may be at an arbitrary location, and directing the light beam to the scanning optical assembly.

The AFM may also include a separate optical mirror mounted to reflect light from the sample and cantilever to an optical microscope assembly. This arrangement makes it possible to directly view the cantilever and areas of interest on the sample. The mirror may be totally reflecting with a hole or it may be a partially reflecting or dichroic mirror to allow the light beam used to measure cantilever deflection to pass through the mirror.

According to the invention, the position detector may be located at a point where all light beams reflected from a cantilever with a fixed bend during a full extent of its movement converge.

This AFM according to the invention uses a light source, usually a laser, which is mounted so that it is not moved by the scanning mechanism, and an optical assembly using any combination of lenses, mirrors, or other optical elements attached to a scanning mechanism (or "scanner"). The motion of one or more of the optical components, attached to the scanner, guides the laser beam so that it always strikes a fixed point on the cantilever, and at a fixed angle with respect to the cantilever.

These and other objects are also obtained by a method of operating an AFM having a remote light source, a cantilever and an optical assembly attached to a scanning mechanism, and a position detector, including the steps of generating a light beam, directing the light beam onto the cantilever using the optical assembly so that the light beam strikes a substantially fixed point on the cantilever during movement of the scanning mechanism, and receiving a reflected light beam reflected from the cantilever using the position detector to detect a deflection of the cantilever.

The method may further take the steps of splitting the light beam into a first beam which strikes the cantilever and a second beam which is directed to a second position detector. The method focuses the first beam to a point source between a fixed end and a free end of the scanning mechanism and then focuses an image of said point source on said cantilever. The method also allows the lateral position of the point source to be changed while maintaining a substantially fixed vertical position of the point source while scanning the scanning mechanism.

BRIEF DESCRIPTION OF THE DRAWINGS

A more complete appreciation of the invention and any of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
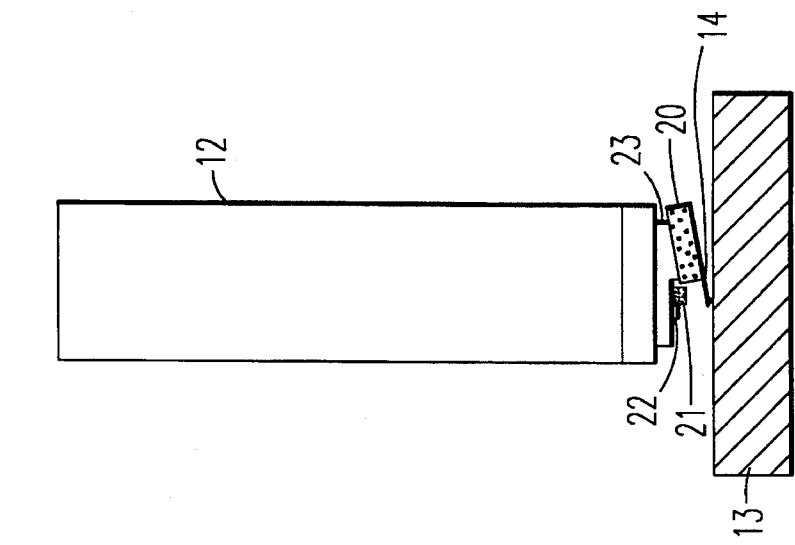
FIG. 2 is a block diagram of a prior art scanned-stylus atomic force microscope incorporating a laser diode interferometer.
Figure 1:
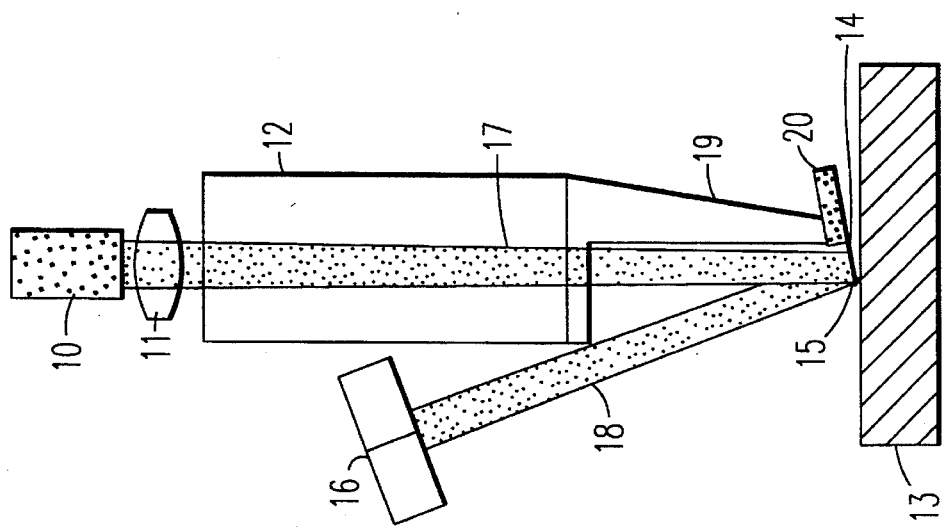
FIG. 1 is a simplified functional block diagram of a prior art optical lever scanned-stylus atomic force microscope.
Figure 3:
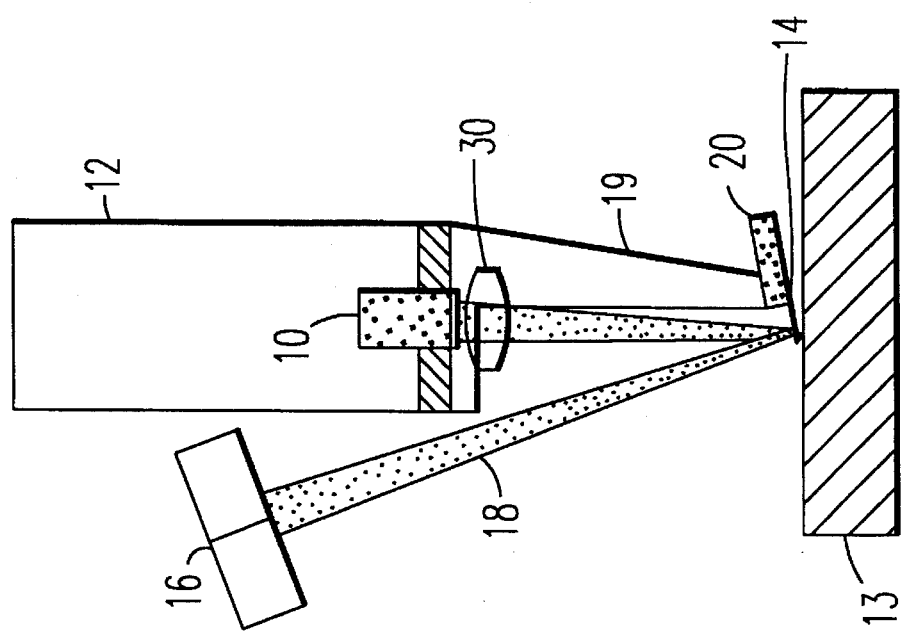
FIG. 3 is a block diagram of a prior art atomic force microscope that scans the stylus and also the laser light source.
Figure 4B:
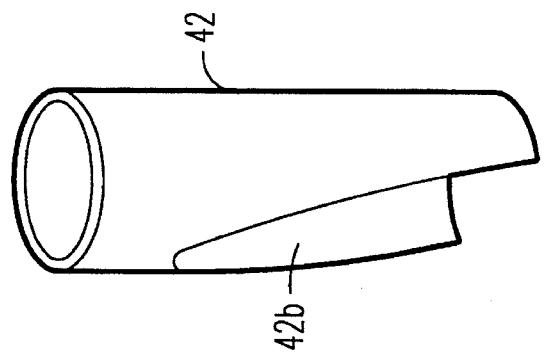
FIG. 4B is a diagram of a tube scanner having an asymmetric cut out.
Figure 4A:
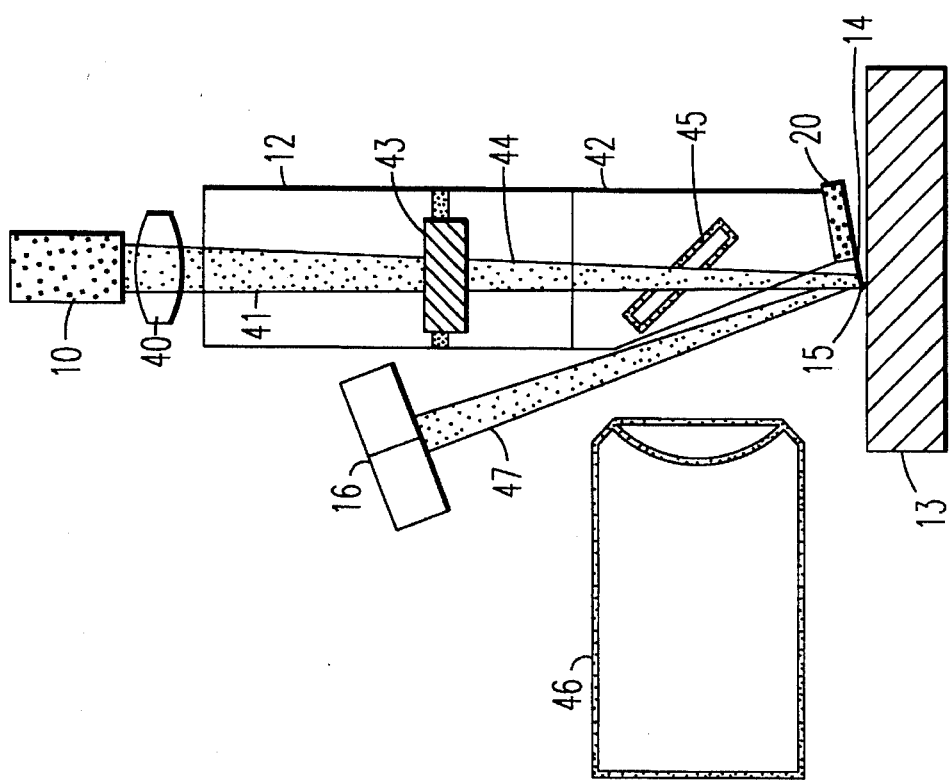
FIG. 4 is a simplified block diagram of an optical lever scanned-stylus atomic force microscope according to a first embodiment of the present invention.

Referring to the drawings, and more particularly to FIG. 4, a first embodiment of the invention will be described. The AFM illustrated in FIG. 4 contains a light source 10, such as a laser, emitting a beam 41 which is directed through or alongside scanner 12. Scanner 12 is typically a piezoelectric translator, but could also be made of electrostrictive, magnetostrictive or other similar material. The scanner 12 is typically a tube translator, made of one or more piezoelectric tubes, as described in U.S. Pat. No. 5,198,715, but could be of different shape and constructed of multiple scanning elements. A first lens 40 is disposed between the laser 10 and scanner 12, or attached to a fixed part of scanner 12. An optical assembly 43 is mounted on scanner 12 for guiding beam 44 onto cantilever 14. Preferably, the optical assembly 43 is mounted to the scanner using a mounting ring, which may be made of metal or an insulating material, or may be mounted using an adhesive. Optical assembly 43 can also be mounted on the exterior of scanner 12 and positioned such that beam 44 is guided onto cantilever 14. The AFM of FIG. 4 can also include a partially reflective mirror or a dichroic mirror 45 and optical microscope 46 for viewing cantilever 14 and sample 13. The mirror 45 may be attached to the optical microscope 46, to the scanner 12 or mounting member 42, or to a separate fixed mounting structure (not shown). The beam 47 reflected from cantilever 14 is detected by position sensitive detector 16.

The cantilever 14 is attached to the scanner 12 via mounting member 42, and possible additional mounting elements (not shown). The additional mounting elements can allow the cantilever assembly to be exchanged for operation in fluid (U.S. Pat. No. 4,935,090) or exchanged with probes for other scanning microscopes like the scanning tunneling microscope. The shape of mounting member 42 allows the beam 47 reflected from cantilever 14 to be detected, and allows other mechanical and optical access to cantilever 14. Parts mechanically similar to mounting member 42 made from metal or insulators have been used in the prior art, but, according to the present invention mounting member 42 is constructed from piezoelectric material and used as an actuator for the vertical, or Z direction. Note that the cut out on mounting member 42 need not be symmetric for the actuator to move substantially in the Z direction. FIG. 4B provides a more detailed view of the scanner 12 and mounting member 42, in particular the cut out which is labeled 42b.

Figure 5:
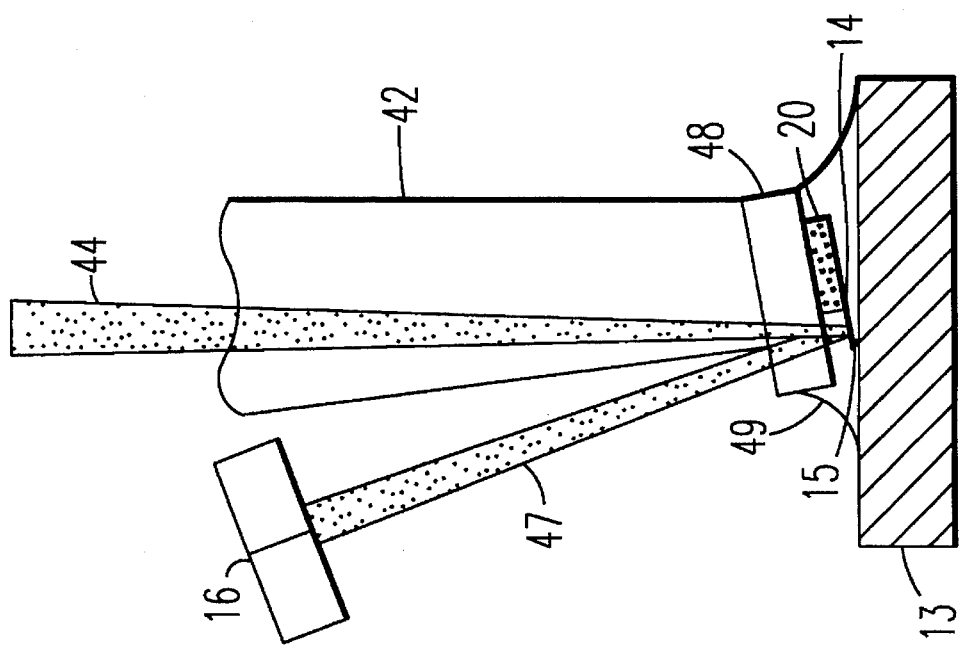
FIG. 5 is a modification of the first embodiment shown in FIG. 4, with the addition of a removable fluid cell allowing operation of the sample covered by fluid.

For operation of an atomic force microscope where the sample 13 and cantilever 14 are covered by fluid, it is usually necessary to construct a fluid cell that presents a flat surface to incoming and outgoing light beams. One such cell is shown in FIG. 5. This fluid cell 48 may be constructed of glass, plastic or other transparent material. This fluid cell 48 is constructed such that at least the surfaces of the cell closest to the cantilever are at the same angle with respect to the incoming light beam 44 as is the cantilever 14. In this ways because of optical symmetry, the light beam leaving the fluid cell 47 will not change its angle when fluid 49 is added to fluid cell 48. It may be advantageous to have both surfaces of the fluid cell 48 be at the same angle as the cantilever 14. In addition, fluid cell 48 is removable and can be exchanged for mounting elements that are optimized for a contact AFM, oscillating probe AFM, scanning tunneling microscopes or other scanning probe microscopes.

As cantilever 14 and stylus 15 are scanned over the surface of sample 13 the beam 44 "follows" the cantilever, i.e. the beam is incident on essentially a fixed spot on cantilever 14 during movement of cantilever 14. The movement of reflected beam 47 is detected by position detector 16. The problem of cantilever 14 moving out from under beam 44 is minimized or eliminated by using the motion of the optical assembly 43 attached to a moving part of scanner 12 (in this example the piezoelectric tube scanner) to guide beam 44 to always strike the same, or substantially the same spot on scanning cantilever 14. The changing position and angle of optical assembly 43 with respect to stationary incoming beam 41 can be used to bend beam 41 in a controlled way so that the bent beam 44 always strikes the same or substantially the same spot on cantilever 14 as it is scanned over sample 13. This will occur if the position of the components of optical assembly 43 is chosen such that the magnification of optical assembly 43 matches the motion produced by scanner 12.

For example, consider the case where scanner 12 includes an XYZ piezoelectric tube translator with an optical assembly 43 attached to the tube. If the tube translator is scanned back and forth, the amount of translation of a point on the tube depends on how far the point is from the fixed end (the fixed end does not move, the free end moves the maximum distance, and intermediate points move some fraction of the maximum). If the optical assembly 43 is placed somewhere between the fixed and free ends, it will move less than a cantilever 14 placed at the free end. The optical assembly may also be mounted in the interior of the tube so that the light beam also propagates through the tube. The scanning motion of optical assembly 43 will cause the light beam 44 to move in a periodic way. Since optical assembly 43 will typically move less than cantilever 14, optical assembly 43 must provide some optical magnification so that the output light beam 44 will move the same distance as the cantilever 14. The moving optical assembly 43 will cause the light beam to accurately follow the moving cantilever 14 if the optical assembly 43 is located so that the optical magnification is matched to a property that can be called the "mechanical amplification" of the scanner 12, or the ratio of the optical assembly 43 motion to the cantilever 14 motion. If the construction and position of optical assembly 43 are such that these magnifications are matched, the light beam 43 will track the moving cantilever 14.

Figure 6:
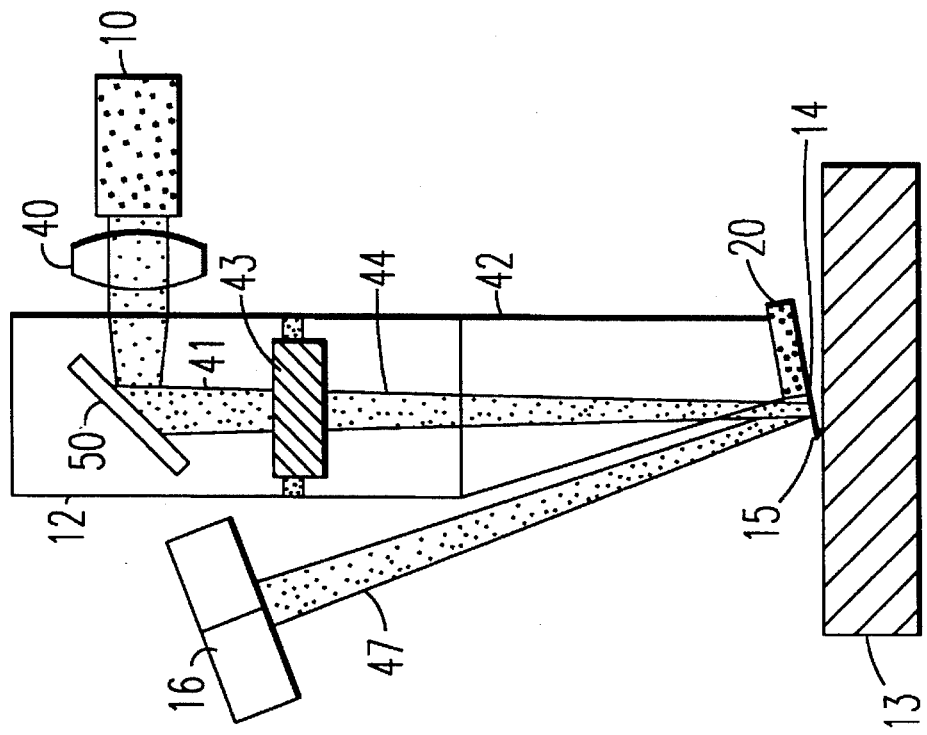
FIG. 6 is a modification of the first embodiment shown in FIG. 4, where the laser is mounted at the side of the scanner.

FIG. 6 is a modification of the embodiment shown in FIG. 4. The light source has been positioned to the side of the scanner 12, and a mirror 50 has been mounted to direct beam 41 from the laser 10 through optical assembly 43 and onto cantilever 14.

Figure 7:
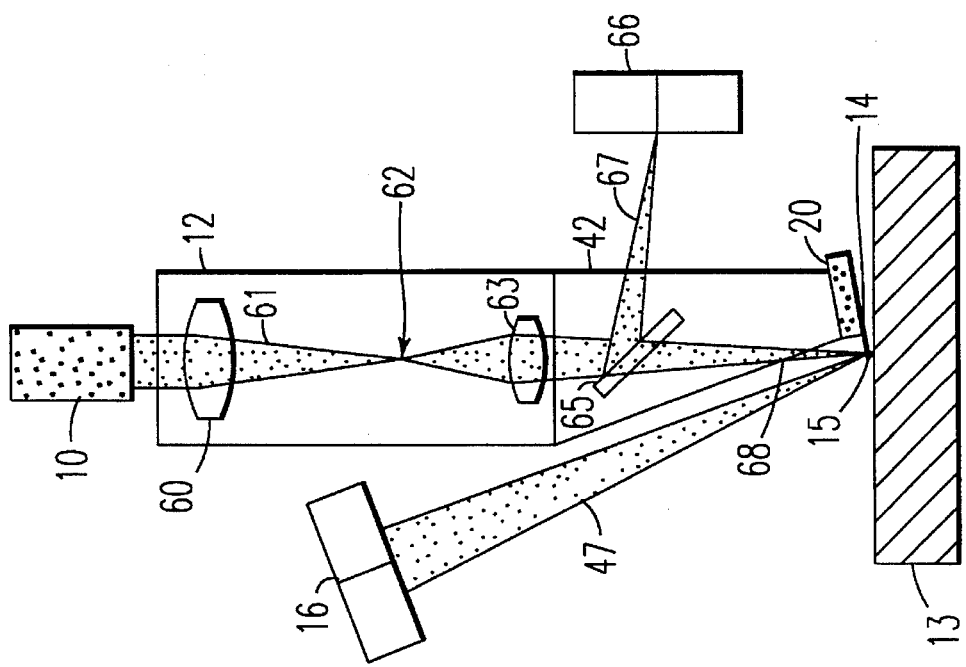
FIG. 7 is a simplified schematic diagram of a scanned-stylus atomic force microscope according to a second embodiment of the present invention.

A second embodiment of the invention is shown in FIG. 7. This AFM includes an optical arrangement incorporating two lenses. A first lens 60 is used to focus beam 61 to a point source 62 at an intermediate point on scanner 12. Lens 60 can be any of a variety of lenses, such as a convex lens or concave lens, so long as point source 62 is formed. Point source 62 could also be created by a diverging lens placed below the desired point source, by an illuminated pinhole, by an optical fiber, by a laser diode or other laser point source, for example. This embodiment also contains a mechanism for steering the light source 10 and/or lens 60 to move the point source 62 in the lateral direction. Moving the point source 62 also moves the position of the focused spot of light beam 68, allowing this beam to be adjusted for varying positions of cantilever 14. The steering mechanism is constructed in such a way that while the horizontal position of point source 62 may be altered, the vertical position, and hence distance from lens 63, is essentially unchanged. Point source 62 forms the object for a second lens 63 mounted to a moving point on the scanner 12. The vertical position and the focal lengths of both lenses are chosen so that the focused image is formed at the cantilever 14. When cantilever 14 is scanned, lens 63 will move laterally relative to the point source object 62. This means that the focused image in the plane of the cantilever will move laterally also. The placement of the lenses can and has been determined by trial and error, resulting in a successful design. Alternatively, a suitable lens position can be computed by the following procedure, involving standard optical calculations. Some simple example calculations are listed below. It may of course be necessary to take into account various optical aberrations, not discussed here. (see, for example, Hecht and Zajac, *Optics*, 3rd Ed., Addison-Wesley, Menlo Park (1976)).

If the steering lens 63 is moved perpendicular to the optical axis with respect to the point source object by a distance $\Delta o$, the focused image will move by a distance $\Delta i$. The distance $\Delta i$ is the sum of the lens motion $\Delta o$ plus additional motion due to the magnification of the optical system. Specifically, $\Delta i = \Delta o + M_L \cdot \Delta o$. Here the optical magnification of the lens system $M_L$ is given by $y_i/y_o$, where $y_i$ is the distance between the lens and the focused image on the cantilever, and $y_o$ is the distance between the lens 63 and the point source object 62.

For a given motion of scanner 12, cantilever 14 moves a distance $\Delta c$ with respect to the point source 62 that is greater than the lens 63 motion $\Delta o$. The ratio of the cantilever motion $\Delta c$ to the lens motion $\Delta o$ may be called the mechanical magnification of the scanner $M_s$. This factor $M_s$ depends on the position of the steering lens 63 and the cantilever 14 with respect to each other and with respect to the scanner 12. This quantity may be calculated theoretically, or measured for a given scanner by a variety of means. It is necessary to arrange the magnification $M_L$ of the lens so that the motion of the focused image $\Delta i$ is approximately the same as the cantilever motion $\Delta c$. In this case the focused spot of light beam 44 moves the same distance as the cantilever 14 as it scans over the sample. Thus, the light beam 44 is incident on a fixed spot on cantilever 14 throughout its motion of scanning.

In the case where $\Delta i = \Delta c$, the optical magnification $M_L$ and the mechanical magnification of the scanner $M_s$ are related in the following manner:

$$M_s = \Delta c/\Delta o = \Delta i/\Delta o = (\Delta o - M_L \cdot \Delta o)/\Delta o = 1 + M_L$$

The choice of lenses and their positions may be determined by trial and error or with the above equations. It should be noted that there are a whole family of lens and position sets that will give satisfactory results. In addition, while the above calculations define sets of lenses and positions that will satisfy one or more objects of the invention, it may be possible to arrive at other lens combinations placed at a variety of positions that accomplish substantially the same task, that is, using an optical assembly moved by the scanner to make the light beam track the cantilever throughout its motion of scanning. It is of course possible and potentially desirable to add other lenses or other optical components to direct the path of light beams 61, 68, 47, or 67, or to reduce various optical aberrations.

FIG. 7 also shows an optional beam splitter 65 and additional position sensitive detector 66 that may be used to measure, calibrate, or control the motion of scanner 12. The optical elements shown in FIG. 7, along with the motion of scanner 12, create a moving light beam 68 to follow cantilever 14 when scanning. A portion 67 of light beam 68 may be directed by beam splitter 65 to an additional position sensitive detector 66. Laser beam 67 will automatically move on position sensitive detector 66 in proportion to the motion of scanner 12. Since piezoelectric translators, commonly used as AFM scanners, suffer from nonlinearities, drift, and hysteresis, it is desirable to measure and correct for these distortions. By measuring the position of laser beam 67 on position sensitive photodetector 66, it is possible to measure the position of scanner 12 in real time. This signal then can be used to calibrate the scanner drive signals to create linear scans, as described in U.S. Pat. No. 5,051,646, to correct AFM data after it has been stored, or to use a feedback system to correct for scanner distortions in real time. Using laser beam deflections to correct for piezoelectric scanner distortions has been described by Marshall in U.S. Pat. No. 5,172,002.

Figure 8:
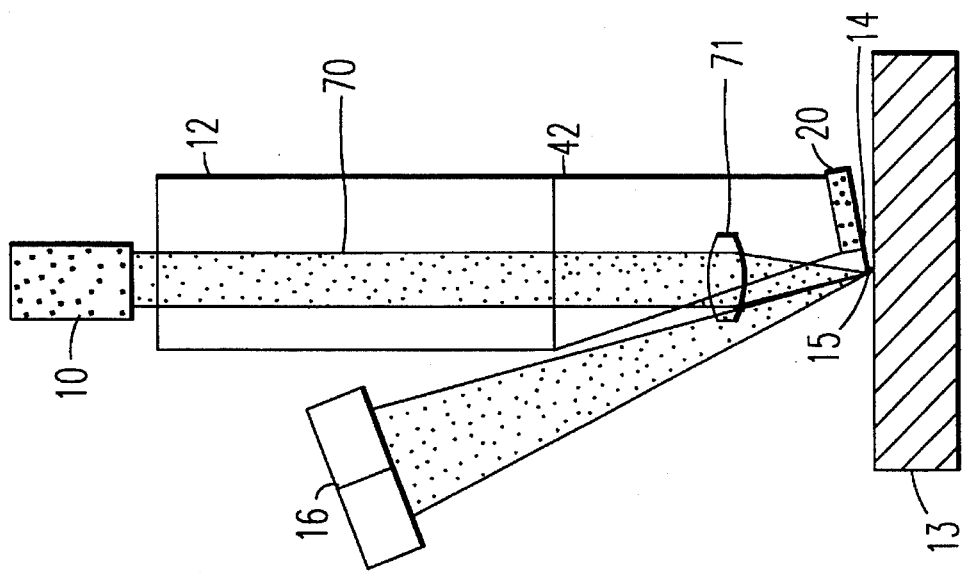
FIG. 8 is a simplified schematic diagram of a scanned-stylus atomic force microscope according to a third embodiment of the present invention.

FIG. 8 shows a third embodiment of the invention that uses a single lens. In this design a parallel laser beam 70 is focused onto a cantilever using a steering lens 71 mounted close to the free end of a scanner. In practice, lens 71 is mounted at least 70% of the distance from the fixed end of the scanner 12 to the cantilever 14. Focussing the parallel beam allows the focused spot to follow the center of the lens. Lens 71 moves almost the same distance and angle as the cantilever. Since the parallel rays of the parallel light beam 70 will focus at a point a fixed distance below the center of lens 71, moving the lens with the cantilever will cause the focused laser spot to track moving cantilever 14. The performance of this embodiment is determined by how close lens 71 can be placed to cantilever 14 in practice. As lens 71 is placed farther from cantilever 14, it will not move as far as cantilever 14 and the tracking accuracy will decrease. This steering lens could also be used as the objective in a optical microscope, allowing optical viewing of the cantilever 14 and sample 13.

Figure 9:
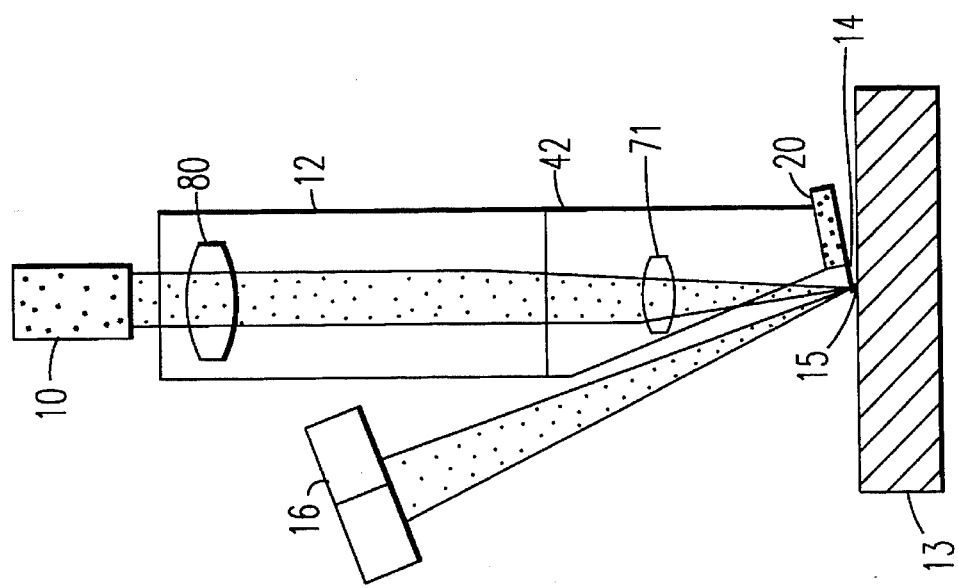
FIG. 9 is a modification of the third embodiment shown in FIG. 8, having multiple lenses.

FIG. 9 shows another alternative optical arrangement, that is a variation of the AFM shown in FIG. 8. In this arrangement a fixed lens 80 is placed above steering lens 71. Fixed lens 80 weakly focuses the beam emitted from light source 10 before it reaches the steering lens. The lenses and their positions are chosen by standard optical calculation where the focal length $f_1$ of fixed lens 80 is much longer than the sum of focal length $f_2$ of steering lens 72 and the separation between lenses 72 and 80. The focal length $f_2$ is chosen so that it focuses the light beams from lens 80 to a spot on cantilever 14. This accomplishes two things. First, it allows the size of steering lens 71 to be smaller, and hence the weight to be less. It is desirable to minimize the weight that scanner 12 must carry to maintain a high mechanical resonant frequency and thus immunity from vibration. Second, fixed lens 80 may be chosen to offset or reduce coma errors introduced at steering lens 71 due to the fact that the angle of lens 71 with respect to the incoming light beam changes as scanner 12 moves steering lens 71 and cantilever 14.

Figure 10:
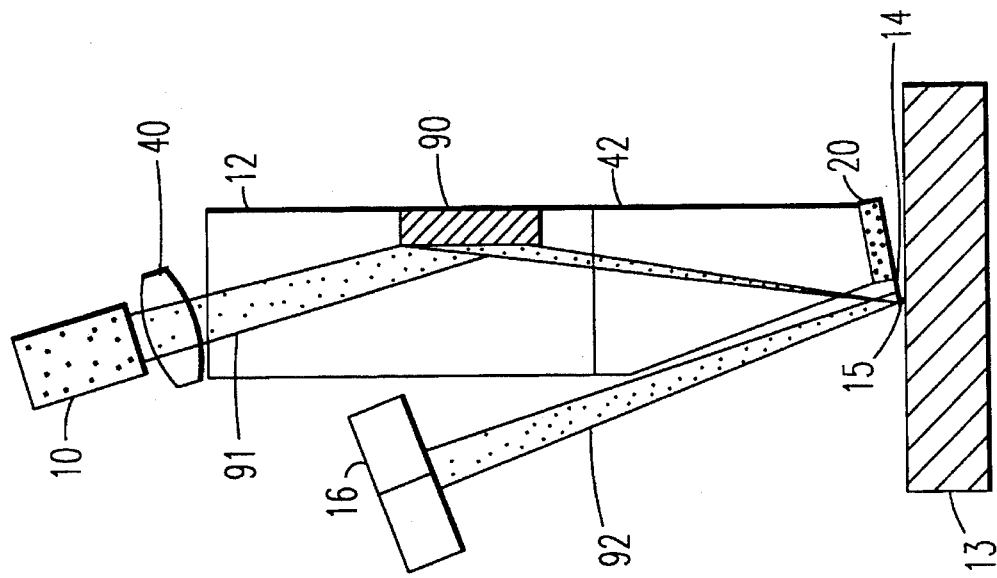
FIG. 10 is a simplified schematic diagram of a fourth embodiment according to the present invention.

A fourth embodiment of the invention is shown in FIG. 10. In this embodiment, the parallel beam emitted by laser 10 is focused so that a spot will result on the cantilever. A steering mirror 90 is placed at a point on scanner 12 so that the translation and angular swing of mirror 90 always guides the laser beam to a moving cantilever. A single mirror could be used for single axis scans, two mirrors could be used for complete two axis scans. A single mirror is shown for clarity. The required position of the mirror 90 will depend on the construction details of scanner 12, but the appropriate position can be found very simply by trial and error. This may be done by varying the position of the mirror 90 with respect to the cantilever until the light beam reflected off the mirror 90 accurately tracks the cantilever 14 throughout its scanning motion.

Since the embodiments shown in FIGS. 8–10 also create a light beam that moves in proportion to the scanner motion, this light beam motion can be used to measure, calibrate or correct the scanner motion as shown in FIG. 7 and described above, i.e., a beam splitter and second position detector could be added.

All of the embodiments described above allow sufficient clearance (up to several inches) between the light source 10 and the cantilever 14 to allow access for an optical microscope. As mentioned, some of the lenses or optical elements used for causing the laser to track the cantilever could be used as part of the optical microscope.

The present invention also provides large scans with uniform tracking forces over the entire scan. As mentioned previously, as cantilever 14 is scanned over a sample 13, both the position and angle of cantilever 14 with respect to a fixed position sensitive detector 16 will change. In the prior art, this caused the reflected laser beam to move on the position sensitive detector, mimicking an actual deflection of the cantilever. These "false deflections" present in prior art AFMs, which were described by Baselt et al, supra, distort images with "bowing," i.e. flat surfaces appear curved. In addition, the feedback system is programmed to keep the position of the reflected laser at the position sensitive detector constant. It will read these "false deflections" as real deflections and adjust the actual deflection of the cantilever to compensate for the errors. Adjusting the actual deflection of the cantilever, changes the tracking force exerted by the cantilever stylus. For many samples, it is necessary to minimize the tracking force to avoid damage to the surface (Hoh and Hansma, supra). The changing tracking force introduced by the prior art AFM makes it impossible to reduce the tracking force to less than the amount that it changes over the scan. In practice, the resultant tracking force may be much larger than delicate samples can withstand. The present invention solves this problem in two ways. First, as described above, ensures that the light beam strikes essentially the same spot on the cantilever as the cantilever is scanned over the surface. This minimizes or eliminates "false deflections" that are caused by variations in the bend of the cantilever as discussed by Baselt, supra. It also ensures that there are no "false deflections" due to the cantilever being scanned out from under the light beam. Secondly, minimizing spurious force variations and eliminating "warped" images is detailed below. For optimal performance, techniques shown in FIGS. 5–10 are intended to be used in combination with one or more of the techniques shown in FIGS. 1–13 and described below.

Figure 11:
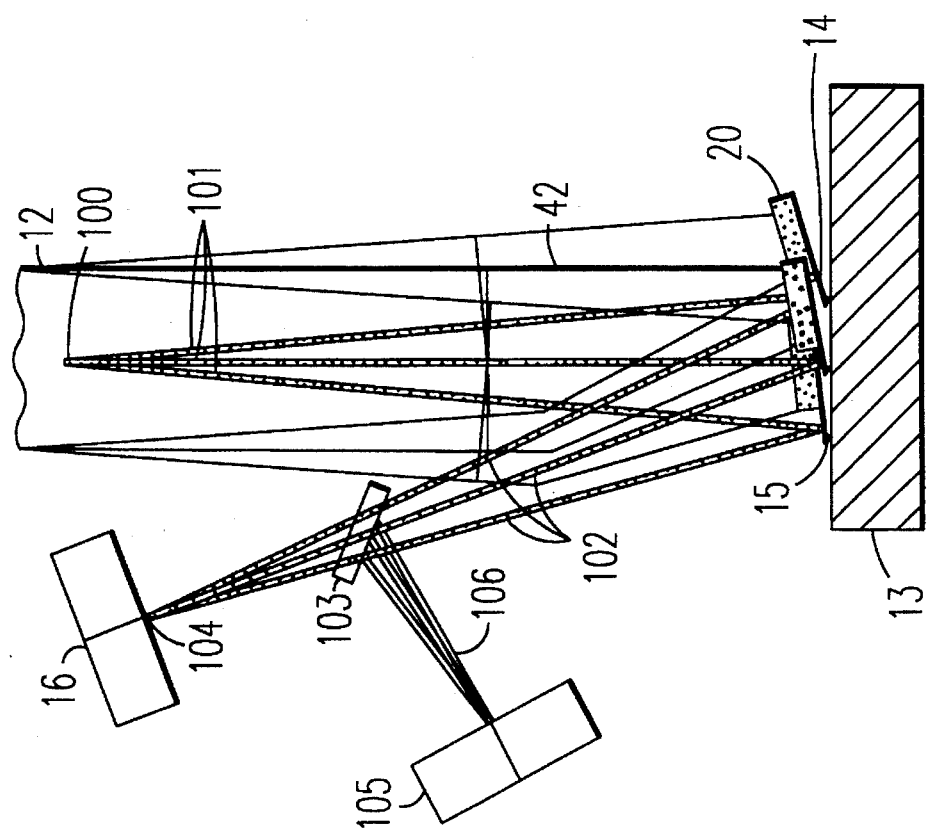
FIG. 11 is a simplified schematic diagram of a scanned-stylus atomic force microscope according to the invention illustrating the placement of the position sensitive detector.

FIG. 11 shows a fifth embodiment of the invention directed to solving the problem described above. In this embodiment, the incoming light beam 101 tracks the moving cantilever 14 by one of the means shown in FIGS. 7–10, or by any other similar means. Now as cantilever 14 scans over the surface of sample 13, both the position and angle of the reflected beam 102 change. In FIG. 11, three different incoming (101) and reflected (102) laser beams are shown, corresponding to three different positions of cantilever 14. As the cantilever 14 scans over surface 13, the angle of the cantilever 14 with respect to the position sensitive detector 16 changes in a predictable and reproducible way. The light beams 101 and 102 are shown schematically as thin lines for clarity, but are actually focused to a small spot onto the cantilever 14 and diverge to the position sensitive detector 16 at point 104 as shown in FIGS. 5–10.

From FIG. 11 it is clear that there is a position in space that all of these reflected laser beams 102 converge, provided that the angle traced out by the scanner 12 is small (in practice, the angles traced out are much less than one degree; the angles shown in FIG. 11 are approximately ±5 degrees). This convergence can be understood in the following way. As the cantilever 14 is scanned over surface 13, the angle of the cantilever 14 with respect to position sensitive detector 16 will change slightly. For example, in FIG. 11, as cantilever 14 is scanned to the left, the angle of cantilever 14 will become shallower, and as cantilever 14 is scanned to the right the angle gets steeper. If one were to plot the angle of cantilever 14 over its entire scan range, the result would be a surface with a slightly convex curvature. The degree and type of curvature of this surface depend on the details of the motion of the scanner 12. In some cases it may be sufficient to consider this surface as a part of a sphere where the radius is given by the distance between the cantilever and the apparent pivoting point of the scanned motion. This convex surface formed by the scanning cantilever 14 will act like a convex mirror of the same curvature. For this reason, this convex surface acts in a way that will focus all reflected beams from a point source to another point, for example the point of convergence 104 shown in FIG. 11. The point at which the beams converge can be determined by geometric construction, or by calculation from standard optical formulas for convex mirrors (see, for example, Hecht and Zajac, supra). If position sensitive detector 16 is placed at or near the focus created by the traced out concave surface, the AFM will be insensitive to the motion of cantilever 14 caused by the scanner 12.

In this embodiment, the position sensitive detector 16 is placed at the point of convergence 104. If position sensitive detector 16 is placed near point of convergence 104, similar results may be obtained, but optimal precision is obtained at point of convergence 104. In this case, the changing angle and lateral position of cantilever 14 no longer moves the reflected laser beam 102 on position sensitive detector 16. In this way "false deflections" are eliminated. Also in practice it is not necessary to determine curvature of the surface created by the scanning cantilever. Instead it is possible to empirically determine the optimum position of the position sensitive detector 16. This is done by scanning the cantilever on a very flat surface or actually not touching any sample, and measuring the change in the position of the signal from the position sensitive detector. The amount of change in this signal is a measure of the amount of "false deflection" being seen by the system. The position sensitive detector may be moved closer or further from the cantilever until these "false deflections" are minimized. It is also possible with this technique to eliminate apparent curvatures that appear because of the pendulum-like motion of the scanner.

FIG. 11 also shows an alternate embodiment where an optional mirror 103 is used to redirect portions 106 of the reflected laser beams 102 so that the point of convergence occurs at another position. This allows the position sensitive detector 105 to be put in a more convenient location.

Figure 12:
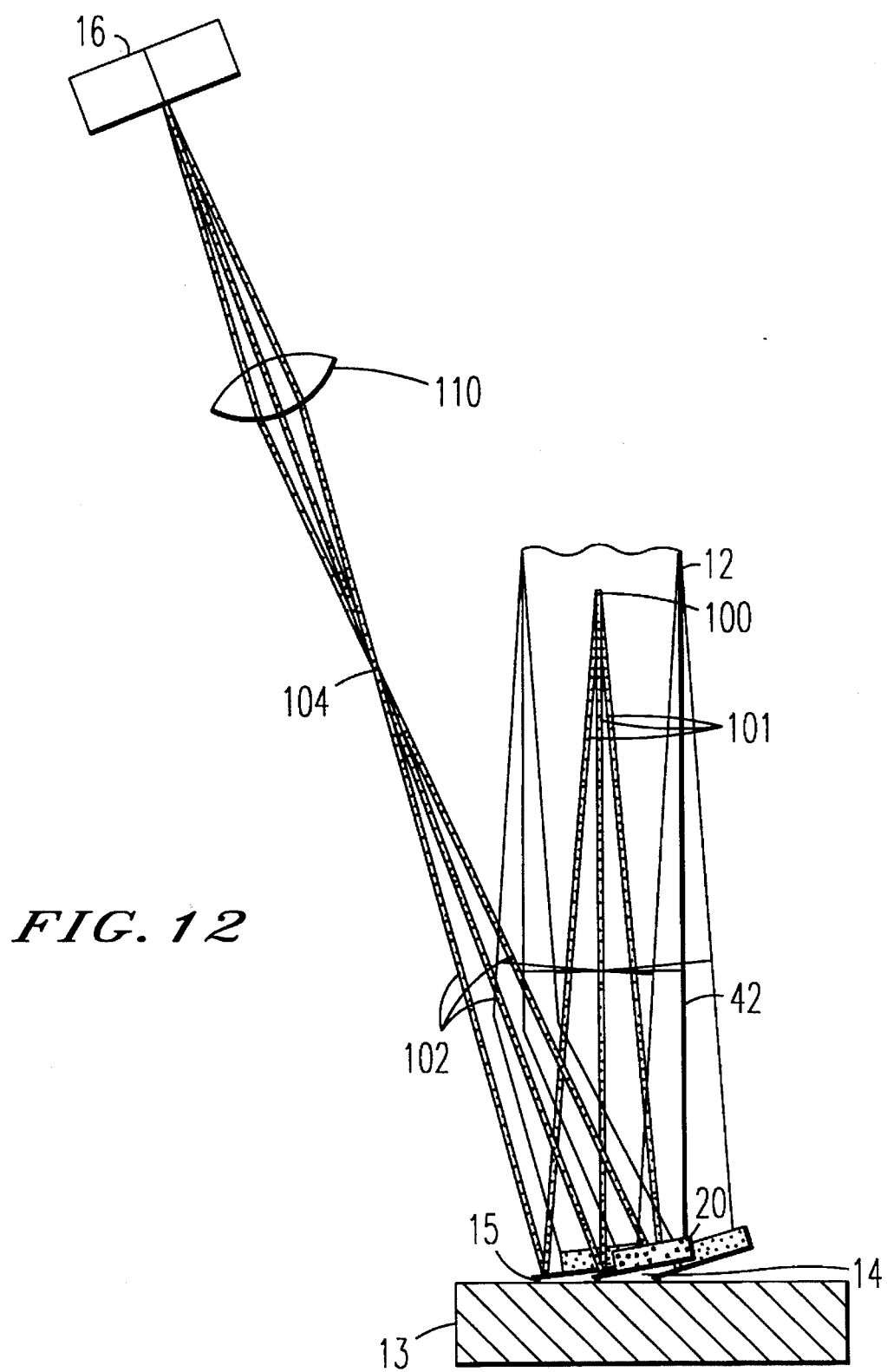
FIG. 12 is a simplified schematic diagram of a first modification of the atomic force microscope shown in FIG. 11.

FIG. 12 shows a modification of the embodiment of FIG. 11 where a relay lens 110 is used to transfer the point of convergence to another more convenient position. Lens 110 may also be used for adjusting the size of the reflected laser beam 102 so that it is optimized for the position sensitive detector 16. It is of course possible to use other lenses using standard optical practice to adjust the rate of convergence of beams 102 to make the convergence point 104 occur at other desired locations. A mirror could also be used in this embodiment anywhere between the cantilever and the position sensitive detector in the same manner as shown in FIG. 11 to direct the point of convergence to a different position.

Figure 13:
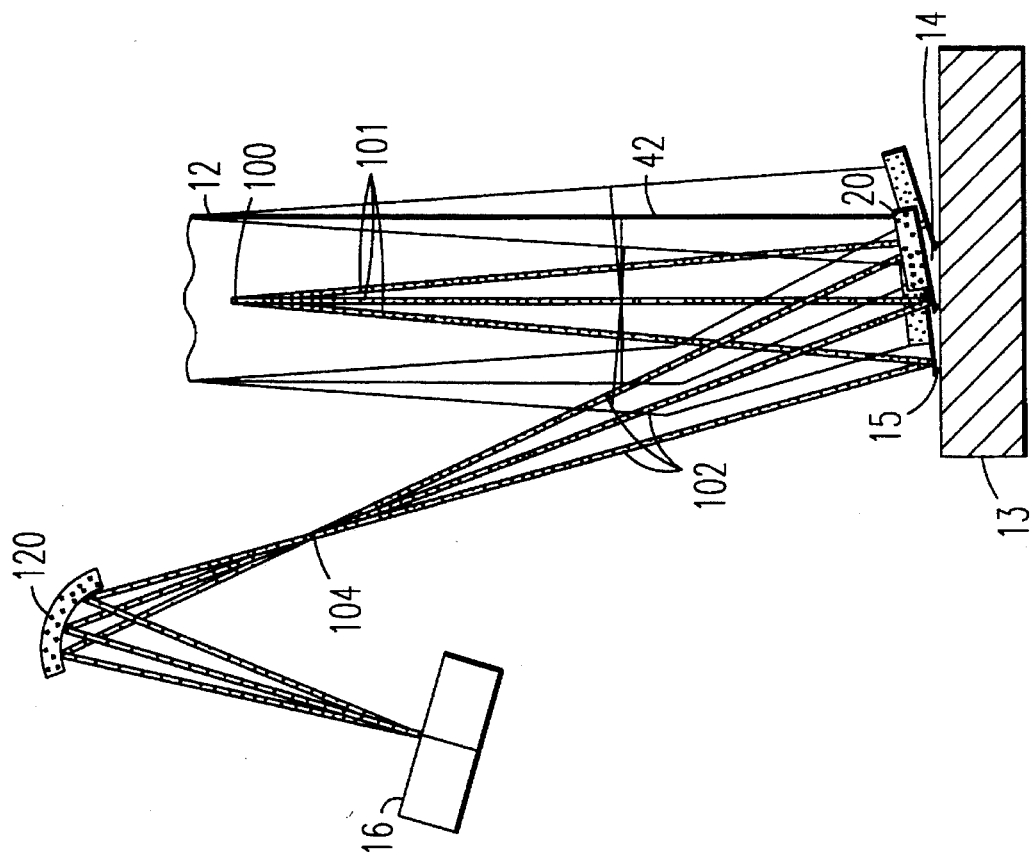
FIG. 13 is a simplified schematic diagram of a second modification of the atomic force microscope shown in FIG. 11.

FIG. 13 shows an alternate embodiment that uses a single concave mirror 120 to redirect the point of convergence shown in FIGS. 11–12 to a more convenient position. In this case the single concave mirror 120 replaces the flat mirror 103 shown in FIG. 11 and the relay lens 110 shown in FIG. 12.

A method of operating the AFM according to present invention will now be described. As shown in FIG. 4, for example, a light beam is generated and then directed onto cantilever 14 using optical assembly 43 so that the light beam strikes substantially a fixed point on cantilever 14, during movement of the scanning mechanism. The striking of substantially a fixed point is illustrated in FIG. 13, where light beams 101 strike cantilever 14 while it is scanned across sample 13. The light beam reflected from cantilever 14 (47 in FIG. 4) is received by position detector 16 which can detect deflections of cantilever 14.

Also illustrated in FIG. 4 is the splitting of beam 44 using splitter 45 and the cut out in mounting member 42 to allow access of an optical microscope 46, while in FIG. 7 the beam 68 is split using splitter 65 to direct a portion of the the beam 68 to a second position detector 66.

Figure 14:
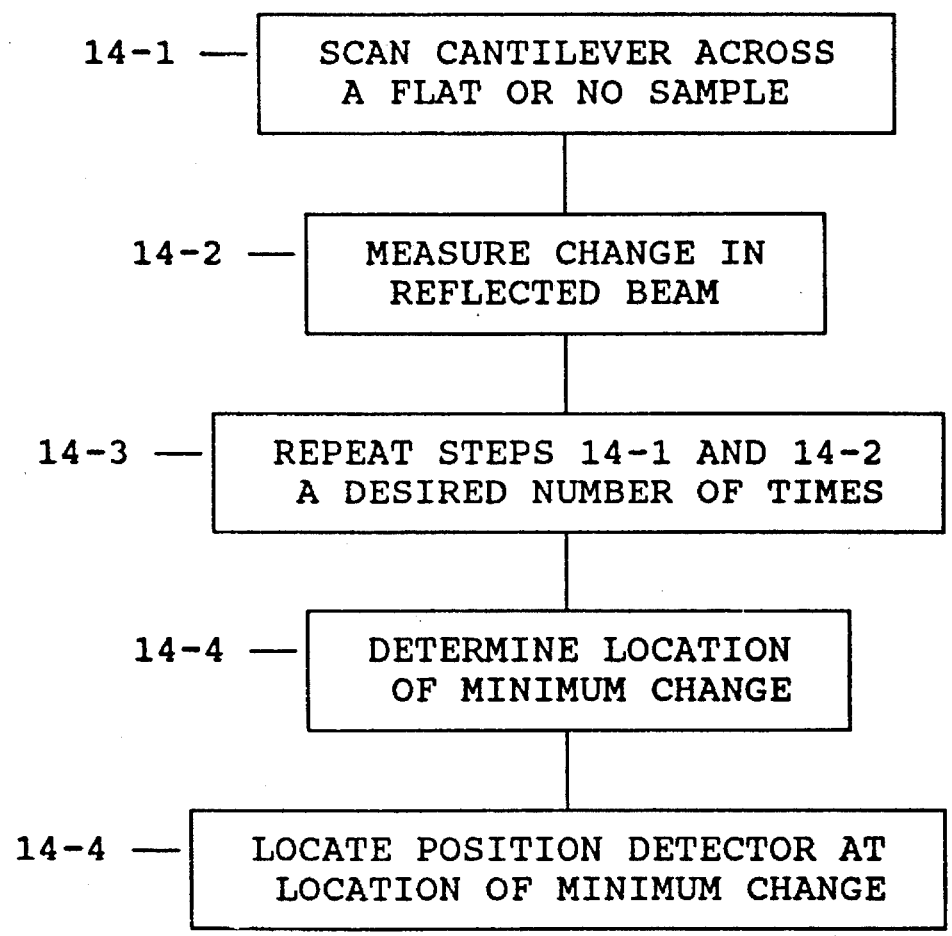
FIG. 14 is a flowchart of a method of operating the atomic force microscope of the invention.

FIG. 14 is a flowchart of a modification of the method of the invention where the location of the position detector is determined. First, in step 14-1, the light beam reflected from the cantilever is measured while the scanner 12 is scanned over a full extent of its movement on a very flat surface or while actually not touching any sample. The change in position in the measured signal is then determined using position sensitive detector 16 (step 14-2). The amount of change in this signal is a measure of the amount of "false deflection" being seen by the system. The position sensitive detector is then moved closer or further from the cantilever (along the optical axis of the reflected beam) and the scanning process repeated (step 14-3) a desired number of times until these "false deflections" are minimized (step 144). Position detector 16 is then placed at this location of minimum change (step 14-5).

While the invention has been described with reference to several specific embodiments, those skilled in the art will be able to make various modifications to the described embodiments without departing from the true spirit and scope of the invention. For example, an AFM that scans using other optical elements such as prisms instead of lenses or mirrors, or other combinations of such elements to keep the laser focused on a scanning cantilever, is within the intended scope of the invention. It is therefore to be understood that within the scope of the appended claims, the invention may be practiced other than as specifically described herein.

Although what has been described is a contact AFM, where the stylus is in constant contact with the surface, the described invention can also be used in applications where the cantilever is oscillated, such as magnetic force microscopy (Martin and Wickeramasingle, Appl. Phys. Lett., 50, pg. 1455 (1987), Non-contact Topography, Durig et al, Phys. Rev. Lett., 53, p. 1045, (1988)) and as a jumping probe microscope where the stylus is repeatedly lifted off the surface during a scan (U.S. patent application Ser. No. 08/009,076), U.S. Pat. No. 5,266,801.

What is claimed as new and desired to be secured by Letters Patent of the United States is:

1. An atomic force microscope, comprising:

a scanning mechanism;

a light source;

a cantilever moved by said scanning mechanism so that said cantilever may be scanned over a fixed sample;

a stylus mounted on said cantilever;

an optical assembly comprising at least one steering lens, mounted on said scanning mechanism to guide a light beam emitted from said light source on the cantilever and to follow substantially a fixed point on said cantilever during movement of said scanning mechanism; and a position detector which receives a reflected light beam from said cantilever and detects a deflection of said cantilever;

wherein said optical assembly comprises means for producing a point source of light between a fixed end and a free end of said scanning mechanism.

2. An atomic force microscope as recited in claim 1, wherein said optical assembly steers said light beam onto a fixed point on said cantilever during a scan of said scanner of at least 30 µm.

3. An atomic force microscope as recited in claim 1, wherein said scanning mechanism comprises a piezoelectric tube scanner and said optical assembly is mounted in said tube scanner.

4. An atomic force microscope as recited in claim 1, wherein said scanning mechanism comprises at least one piezoelectric member, where said at least one piezoelectric member has an asymmetric cutout.

5. An atomic force microscope as recited in claim 1, wherein said scanning mechanism comprises:

a piezoelectric tube scanner; and a mounting member attached to said tube scanner and made of piezoelectric material, said cantilever being attached to said mounting member.

6. An atomic force microscope as recited in claim 3, further comprising an optical mirror mounted in or in a vicinity of said tube scanner for receiving a light beam from said light source and directing said light beam to said optical assembly.

7. An atomic force microscope as recited in claim 1, further comprising:

a second position detector; and a beam splitter for directing a portion of light emitted from said light source onto said second position detector, wherein said beam splitter is mounted between said optical assembly and said cantilever;

wherein an output of the position detector is used to measure a motion of the scanner and cantilever in X and Y scan directions.

8. An atomic force microscope as recited in claim 1, wherein:

said scanning mechanism comprises a scanner; and said optical assembly comprises a focus lens, and a steering lens mounted in or alongside said scanner, said point source being formed between said focus lens and said steering lens.

9. An atomic force microscope as recited in the claim 8, wherein said focus lens and said steering lens focus an image of said point source on said cantilever, during scanning motion of said cantilever.

10. An atomic force microscope as recited in claim 8, further comprising an adjustment system for moving a position of the point source in a rough plane that is generally parallel to the sample, but maintaining an essentially fixed vertical position, keeping a vertical distance between said point source and said steering lens substantially constant, wherein said adjustment system allows the image to be moved onto said cantilever.

11. An atomic force microscope as recited in claim 8, wherein a distance moved by said steering lens during scanning of said cantilever is Δo, a distance moved by said image during said scanning is Δi, $y_i$ is a distance between said steering lens and said image, and $y_o$ is a distance between said steering lens and said point source, a magnification of said optical assembly $M_f = y_i/y_o$, and a mechanical magnification of said system $M_s$ is chosen such that:

$$M_s = \Delta i/\Delta o = 1 + M_f.$$

12. An atomic force microscope as recited in claim 1, wherein said optical assembly comprises:
   means for forming a focused spot using said light beam; and
   a lens adapted to image said spot on said cantilever; wherein a distance moved by said lens during scanning of said cantilever is Δo, a distance moved by said image during said scanning is Δi, $y_i$ is a distance between said lens and said cantilever, and $y_o$ is a distance between said lens and said image, a magnification of said optical assembly $M_f = y_i/y_o$, and a mechanical magnification of said system $M_s$ is chosen such that:

$$M_s = \Delta i/\Delta o = 1 + M_f.$$

13. An atomic force microscope as recited in claim 1, wherein said light source is not moved by said scanning mechanism.

14. An atomic force microscope as recited in claim 1, wherein said optical assembly is mounted inside said scanning mechanism.

15. An atomic force microscope as recited in claim 14, wherein said optical assembly is translated by said scanning mechanism to focus said light beam on to said cantilever and to steer said focused light beam such that said focused light beam follows substantially said fixed point on said cantilever.

16. An atomic force microscope, comprising:
   a scanning mechanism;
   a light source;
   a cantilever moved by said scanning mechanism so that said cantilever may be scanned over a fixed sample;
   a stylus mounted on said cantilever;
   an optical assembly comprising at least one steering lens, mounted on said scanning mechanism to guide a light beam emitted from said light source on the cantilever and to follow substantially a fixed point on said cantilever during movement of said scanning mechanism; and
   a position detector which receives a reflected light beam from said cantilever and detects a deflection of said cantilever;
   wherein said optical assembly comprises:
      a first lens for focusing light from said light source to a point source between a fixed end and a free end of said scanning mechanism; and
      a steering lens mounted between said point source and said cantilever.

17. An atomic force microscope comprising:
   scanning mechanism;
   a light source;
   a cantilever moved by said scanning mechanism so that said cantilever may be scanned over a fixed sample;
   a stylus mounted on said cantilever;
   an optical assembly comprising at least one steering lens, mounted on said scanning mechanism to guide a light beam emitted from said light source on the cantilever and to follow substantially a fixed point on said cantilever during movement of said scanning mechanism; and
   position detector which receives a reflected light beam from said cantilever and detects a deflection of said cantilever;
   wherein said position detector is located at a point where light beams reflected from said cantilever converge when said cantilever is undeflected during a full extent of movement of said scanning mechanism so that said position detector is substantially sensitive to a deflection motion of said cantilever rather than a scanning motion of said cantilever.

18. An atomic force microscope as recited in claim 17, further comprising:
   second position detector; and
   a beam splitter for directing a portion of light beams reflected from said cantilever onto said second position detector, so that the detector is sensitive to the scanning motion of the cantilever.

19. An atomic force microscope as recited in claim 17, further comprising a relay lens mounted between said cantilever and said position detector for relaying light beams reflected from said cantilever, such that said point is translated to an alternate location.

20. An atomic force microscope as recited in claim 17, further comprising a relay mirror mounted between said cantilever and said position detector for relaying light beams reflected from said cantilever to a desired location.

21. An atomic force microscope, comprising:
   a scanning mechanism;
   light source;
   a cantilever moved by said scanning mechanism so that said cantilever may be scanned over a fixed sample;
   a stylus mounted on said cantilever;
   an optical assembly comprising at least one steering lens, mounted on said scanning mechanism to guide a light beam emitted from said light source on the cantilever and to follow substantially a fixed point on said cantilever during movement of said scanning mechanism; and
   position detector which receives a reflected light beam from said cantilever and detects a deflection of said cantilever;
   wherein said position detector is located at or near a point where a minimum deflection is measured when said cantilever is undeflected and scanned over a full extent of movement of said scanning mechanism.

22. A method of operating a scanning probe microscope having a scanning mechanism, a light source, a cantilever and an optical assembly comprising at least one steering lens or steering mirrors attached to said scanning mechanism, and a position detector, comprising:
   generating a light beam;
   directing and focusing said light beam onto said cantilever using said optical assembly so that said light beam strikes a substantially fixed point on said cantilever during movement of said scanning mechanism; and
   receiving a reflected light beam reflected from said cantilever using said position detector to detect a deflection of said cantilever;
   wherein said directing step comprises:
      forming a point source between a fixed end and a free end of said scanning mechanism.

23. A method as recited in claim 22, further comprising:
splitting said light beam into a first beam which strikes said cantilever and a second beam which is directed to a second position detector, wherein said second beam and second position detector are used to measure, calibrate, or correct motion of the scanning mechanism.

24. A method as recited in claim 22, wherein said directing step further comprises:
focusing an image of said point source on said cantilever.

25. A method as recited in claim 22, further comprising:
moving a lateral position of said point source while maintaining a substantially fixed vertical position of said point source while scanning said scanning mechanism.

26. A method as recited in claim 24, wherein said optical assembly comprises a focus lens, and a steering lens mounted on said scanning mechanism, said point source being formed between said focus lens and said steering lens, a distance between said steering lens and said image being $y_1$, and a distance between said steering lens and said point source being $y_0$, said method further comprising:
scanning said cantilever;
moving said optical assembly a distance $\Delta o$ during said scanning;
moving said image a distance $\Delta i$ during said scanning;
defining a magnification of said optical assembly as $M_f = y_1/y_0$; and
selecting a mechanical magnification $M_s = \Delta i/\Delta o = 1 + M_f$.

27. A method of operating a scanning probe microscope having a scanning mechanism, a light source, a cantilever and an optical assembly comprising at least one steering lens or steering mirrors attached to said scanning mechanism, and a position detector, comprising:
generating a light beam;
directing and focusing said light beam onto said cantilever using said optical assembly so that said light beam strikes a substantially fixed point on said cantilever during movement of said scanning mechanism;
receiving a reflected light beam reflected from said cantilever using said position detector to detect a deflection of said cantilever; and
locating said position detector at a point where light beams reflected from said cantilever converge when said cantilever is undeflected during a full extent of scanning motion of said scanning mechanism.

28. A method as recited in claim 27, further comprising:
splitting said light beams reflected from said cantilever into a first beam which is directed to said position detector and a second beam which is directed to a second position detector, wherein said second beam and second position detector are used to measure, calibrate, or correct motion of the scanning mechanism.

29. A method of operating a scanning probe microscope having a scanning mechanism, a light source, a cantilever and an optical assembly comprising at least one steering lens or steering mirrors attached to said scanning mechanism, and a position detector, comprising:
generating a light beam;
directing and focusing said light beam onto said cantilever using said optical assembly so that said light beam strikes a substantially fixed point on said cantilever during movement of said scanning mechanism;
receiving a reflected light beam reflected from said cantilever using said position detector to detect a deflection of said cantilever;
determining a point where light beams reflected from said cantilever converge when said cantilever is undeflected during a full extent of movement of said scanning mechanism; and
relaying said light beams reflected from said cantilever to a desired position.

30. A method as recited in claim 29, further comprising using a relay lens to relay said light beams reflected from said cantilever, to generate said point at an additional alternative location.

31. A method as recited in claim 29, further comprising:
using a relay mirror to relay said light beams reflected from said cantilever, to generate said point at an additional alternative location.

32. A method of operating a scanning probe microscope having a scanning mechanism, a light source, a cantilever and an optical assembly comprising at least one steering lens or steering mirrors attached to said scanning mechanism, and a position detector, comprising:
generating a light beam;
directing and focusing said light beam onto said cantilever using said optical assembly so that said light beam strikes a substantially fixed point on said cantilever during movement of said scanning mechanism;
receiving a reflected light beam reflected from said cantilever using said position detector to detect a deflection of said cantilever;
measuring a change in said reflected light beam when said cantilever is undeflected and scanned over a full extent of said scanning mechanism; and
locating said position detector at a point where said change is a minimum.

33. An atomic force microscope, comprising:
a scanning mechanism;
a light source;
a cantilever moved by said scanning mechanism so that said cantilever may be scanned over a fixed sample;
a stylus mounted on said cantilever;
an optical assembly comprising at least one steering lens, mounted on said scanning mechanism to guide a light beam emitted from said light source on the cantilever and to follow substantially a fixed point on said cantilever during movement of said scanning mechanism; and
a position detector which receives a reflected light beam from said cantilever and detects a deflection of said cantilever;
wherein said scanning mechanism comprises:
at least one piezoelectric, electrostrictive, magnetostrictive or similar scanning device; and
a mounting member with an asymmetric cutout attached to said scanning mechanism, said cantilever being attached to said mounting member;
said asymmetric cutout providing optical and mechanical access to allow at least one of insertion of at least one optical elements to provide viewing of at least one of the cantilever and the sample with an optical microscope, and an optical path for said reflected light beam from said cantilever.

34. An atomic force microscope as recited in claim 33, wherein said mounting member is made of piezoelectric material.

35. An atomic force microscope as recited in claim 34, wherein said mirror is mounted on said scanning mechanism such that, during movement of said scanning mechanism, the light beam reflected off said mirror will strike substantially a fixed spot on said cantilever, or track the motion of said cantilever in one direction.

36. An atomic force microscope, comprising:

a scanning mechanism;

a light source not moved by the scanning mechanism;

a cantilever moved by said scanning mechanism so that said cantilever may be scanned over a fixed sample;

a stylus mounted on said cantilever;

an first optical assembly consisting of at least one lens to focus a light beam emitted from said light source and a second optical assembly containing at least one mirror, mounted on and translated by said scanning mechanism to steer said focused light beam to follow substantially a fixed point on said moving cantilever during movement of said scanning mechanism; and a position detector which receives a reflected light beam from said cantilever and detects a deflection of said moving cantilever.

37. An atomic force microscope as recited in claim 36, wherein said position detector is located at an optimal position where all light beams reflected from said cantilever converge when said cantilever is undeflected during a full extent of movement of said scanning mechanism so that the position detector is substantially sensitive to a deflection motion of the cantilever rather than to a scanning motion of said cantilever.

38. An atomic force microscope as recited in claim 36, wherein said position sensitive detector is located at or near a point where a minimum deflection is measured when said cantilever is undeflected and scanned over a full extent of movement of said scanning mechanism.

39. An atomic force microscope, comprising:

a scanning assembly;

a light source;

a cantilever moved by said scanning mechanism so that said cantilever may be scanned over a fixed sample;

a stylus mounted on said cantilever;

means to focus a light beam emitted from said light source on the cantilever; and a position detector which receives a reflected light beam from said cantilever and detects a deflection of said scanning cantilever;

said scanning assembly comprising at least one translating element having at least one asymmetric cutout.

40. A scanner as recited in claim 39, where said asymmetric cutout is occupied by at least one optical elements to allow viewing of at least one of the atomic force microscope and said cantilever with an optical microscope.

41. A scanner as recited in claim 39, where said asymmetric cutout provides an optical path for the light beam reflected from the cantilever to reach said position detector.

* * * * *

UNITED STATES PATENT AND TRADEMARK OFFICE
CERTIFICATE OF CORRECTION

PATENT NO. : 5,463,897
DATED : NOVEMBER 7, 1995
INVENTOR(S) : PRATER ET AL

It is certified that error appears in the above-indentified patent and that said Letters Patent is hereby corrected as shown below:

Column 1, after the title of the invention, insert as a new paragraph --This invention was made with Government support under Grant No. DMR89-17164, awarded by the National Science Foundation. The Government has certain rights in this invention.--

Signed and Sealed this

Third Day of December, 1996

*Attest:*

BRUCE LEHMAN

*Attesting Officer*  Commissioner of Patents and Trademarks